United States Patent
Haines et al.

(10) Patent No.: US 10,549,862 B1
(45) Date of Patent: Feb. 4, 2020

(54) METHOD AND SYSTEM FOR SMART AND CONTINUOUS ENGINE OPERATION MONITORING

(71) Applicant: General Electric Company, Schenectady, NY (US)

(72) Inventors: Alexander James Haines, Cincinnati, OH (US); Matthew William Wiseman, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/122,829

(22) Filed: Sep. 5, 2018

(51) Int. Cl.
*B64D 31/04* (2006.01)
*F02D 41/22* (2006.01)
*F02D 41/26* (2006.01)
*F02D 41/28* (2006.01)

(52) U.S. Cl.
CPC ............ *B64D 31/04* (2013.01); *F02D 41/22* (2013.01); *F02D 41/263* (2013.01); *F02D 41/28* (2013.01); *F02D 2041/285* (2013.01)

(58) Field of Classification Search
CPC ....... B64D 31/04; F02D 41/22; F02D 41/263; F02D 41/28; F02D 2041/285
See application file for complete search history.

(56) References Cited

U.S. PATENT DOCUMENTS 6,358,186 B1 * 3/2002 Kosik ................... F16D 48/066
                                                          477/176
7,307,644 B2 * 12/2007 Glen ........................ G06F 3/14
                                                          345/589

\* cited by examiner

*Primary Examiner* — Hieu T Vo
(74) *Attorney, Agent, or Firm* — Wood IP LLC

(57) ABSTRACT

There is provided a system for monitoring an engine. The system includes a processor. A memory including instructions that, when executed by the processor, cause the processor to perform certain operations. The operations may include receiving a first data set and a second data set. The first data set being sampled at a first rate and the second data set being sampled at a second rate, where the first and second rate are different. The operations further include determining, based on a number of occurrences in either the first data set or the second set, whether an event that has occurred in the engine has occurred a predetermined number of times. The operations further include recording the first data set as an output in response to the number of occurrences exceeding the predetermined number of times, and in the contrary recording the second data set as the output. The operations may include computing a ratio of a fast recording process to a slow recording process and adjusting an output file size according the ratio. Another feature may be a look back subsystem that backfills an interval of pre-event fast recordings when an event is detected. The system can self-adjust thresholds to maintain file size constraints during unusually active or eventful flights.

20 Claims, 3 Drawing Sheets

METHOD AND SYSTEM FOR SMART AND CONTINUOUS ENGINE OPERATION MONITORING

BACKGROUND

Engine control units (ECUs) and associated engine monitoring functions, or alternatively engine monitoring units (EMUs), typically collect and send data to an aircraft's main control system to allow decision making by maintainers, or decision making by other systems communicatively coupled to the engine. An EMU may also refer to an actual unit or to the engine monitoring function within an ECU.

In either the case of an ECU or an EMU, there is a trove of data that are internal to the engine; these data are not transmitted to other systems. These data are generated as a result of the engine's operation, and they can contain important information that can give insights into the engine's health and usage. Thus, these data may provide useful life cycle management insights, which can help prevent failures and extend time on wing.

As a non-limiting example, these data can include internal engine sensor measurements or subsystems calculated states, e.g. the internal temperature of a combustor. Furthermore, the values of these data may be parametrized, i.e. they may depend on specific states of one or more engine subsystems. Typical EMUs are currently not configured for intelligent and continuous engine monitoring. While they can log engine internal data, they do not do so in such a way that maintenance crews can easily gain proper insights in engine past operation and health. As such, with typical EMUs, engineers must make decisions about what to store and what to not store given size and communication limitations.

SUMMARY

Given the aforementioned issues, there is a need for smart and continuous engine monitoring that allows EMUs to measure key internal engine parameters and log the measured data in such a way to easily provide insights to maintenance crews. Furthermore, given that internal engine data can be quite voluminous in nature, there is a need for EMUs that can properly mitigate the data size-to-data relevance trade-off. The embodiments described herein help solve or mitigate the aforementioned issues and other issues particular to engine monitoring.

For example, one embodiment provides a system for monitoring an engine. The system includes a processor. The system also includes a memory including instructions that, when executed by the processor, cause the processor to perform certain operations. The operations may include receiving a first data set and a second data set. The first data set may be sampled at a first rate and the second data set at a second rate, where the first and second rates are different.

The operations further include determining, based on a number of occurrences in either the first data set or the second set, whether an event that has occurred in the engine has occurred a predetermined number of times. The operations further include recording the first data set as an output in response to the number of occurrences exceeding the predetermined number of times, and in the contrary, recording the second data set as the output.

Another embodiment provides a system for monitoring an engine. The system includes a processor and a memory including instructions that, when executed by the processor, cause the processor to perform certain operations. The operations may include computing a ratio of a fast recording process to a slow recording process and adjusting an output file size according the ratio.

Another embodiment provides a method for monitoring an engine. The method includes receiving, by a system communicatively coupled to the engine, a first data set and a second data set. The first data set is sampled at a first rate and the second data set is sampled at a second rate, where the first and second rates are different. The method further includes determining, by the system, based on a number of occurrences in either the first data set or the second set, whether an event that has occurred in the engine has occurred a predetermined number of times. Further, the method includes in response to the number of occurrences exceeding the predetermined number of times, recording, by the system, the first data set as an output. Furthermore, the method includes, in response to the number of occurrences not exceeding the predetermined number of times, recording, by the system, the second data set as the output.

Figure 1:
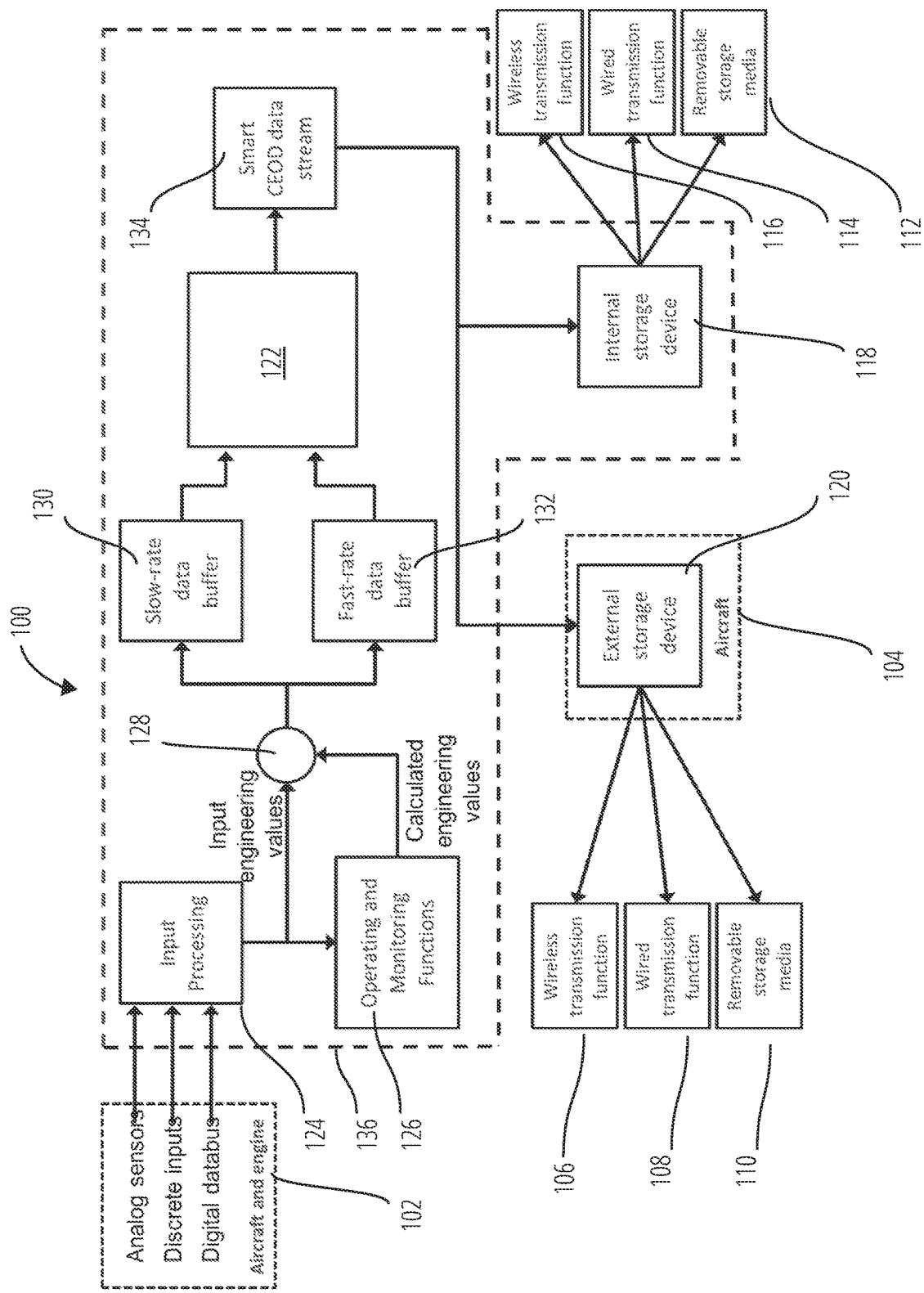
FIG. 1 illustrates a system in accordance with one embodiment.

The drawings are for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of the embodiments.

DETAILED DESCRIPTION

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

Generally, one non-limiting embodiment of the teachings featured in the present disclosure can be a variable-rate monitoring system. This exemplary system reduces recording speed during steady state and low-interest intervals of engine operation, and it responds to events and transients in operation by recording at a faster rate. The triggers and thresholds at which this rate switching is achieved can be adjustable (either statically or dynamically) to accommodate varying constraints on output file size, i.e. the volume of data that is outputted by the EMU. Further, another feature may be a look back subsystem that backfills an interval of pre-event fast recordings when an event is detected. In one example, the exemplary system can self-adjust thresholds to maintain file size constraints during unusually active or eventful flights.

The one exemplary embodiment can include a variety of features or subset of features that allow smart and continuous engine monitoring. For example, and not by limitation, the embodiment includes hardware configured to record time-varying parameters as time-series data. Another feature of the hardware can be the ability to change the frequency at which parameters are recorded, and the frequency may be dependent on changes (e.g., magnitude of rate of change) in the underlying data. Yet another ability may be the capability to adapt the sensitivity to changes by adjusting a threshold either statically or dynamically.

Furthermore, yet another feature of the hardware may be the ability of high frequency capture during transients and events. The hardware may assign a hierarchy to events with a limit on the number of events of a given tier, and a limit on a total number of events. The limit of the number of events at each tier can be adjustable. Furthermore, recorded parameter lists can be categorized under various groups, each of which can have its own set of triggers, trigger events, or sensitivity thresholds.

The hardware may be configured to provide a look-back feature such that when a condition triggers the fast recording option, a predetermined interval of time, prior to the trigger, is retroactively placed in the file, giving some amount of pre-trigger high speed data. For example, a 30-second buffer of high speed data can be maintained during periods of slow recording; then when an event occurs, the most recent 30 seconds of slow data can be overwritten by the fast buffer, and the recording from that point proceeds at the faster rate for a predetermined amount of time related to that event.

Thresholds (for events and transient sensitivity) can be automatically adjusted so that the resulting file size (in MB/hr) tends toward a predetermined value. This can be measured in terms of a fast to slow recording ratio. For example, if a lot of transient behavior or many events are recorded at a high rate, such that the file size is growing beyond a certain desired MB/hr, then the thresholds can be self-adjusted to trigger fewer fast recordings until the file size is brought back into line.

Without loss of generality, the embodiments can use a variety of numeric representations including parameter-specific n-bit fixed point similar to (but not limited to) 717/767 format recordings, or other space-saving formats, in addition to standard floating point, fixed point, and bit-packed formats.

FIG. 1 illustrates a smart monitoring system 100 according to an embodiment. The system 100 includes a smart monitoring module 138 configured to perform one or more tasks associated with monitoring of an engine. For example, upon receiving input data from an aircraft and/or engine control module 102, the smart monitoring module 138 may perform one or more tasks including but not limited to: variable rate data recording, event detection and categorization, thresholding, dynamic threshold adjustment, file size monitoring, and output formatting.

The input data may be, for example and not by limitation, analog data obtained from analog sensors associated with the engine or with other aircraft subsystems. The input data may include discrete data from one or more sensors associated with the engine or with other aircraft subsystems. Furthermore, the input data may include digital data from a digital bus of an EMU of the engine.

The smart monitoring module 138 may output a result of the one or more tasks to an output module 104 that is external to the engine. The output module 104 can include an external storage 120 from which data can be extracted by one or more means during or at the completion of a flight. For example, extraction from the external storage 120 can be achieved using a wireless transmission module 106, a wired transmission module 108, or by removing a removable data storage 110 from the external storage 120.

Similarly, the smart monitoring module 138 may output a result of the one or more tasks to an internal storage 118 that is internal to the engine or to one of its associated subsystems, such as an EMU for example. Data may be extracted from the internal storage 118 using one or more means, during or at the completion of a flight. For example, extraction from the internal storage 118 can be achieved using a wireless transmission module 116, a wired transmission module 114, or by removing a removable storage medium 112 from the internal storage 118.

Having described the input and output hardware and functions of the smart monitoring module 138, hardware and functions internal to the smart monitoring module 138 are now described. Upon receiving input data from the module 102, the smart monitoring module 138 can process the input data at an input processing module 126 located therein. The processing at that stage can include formatting the data according to a predetermined format that is suitable for subsequent modules of the smart monitoring module 138.

Furthermore, the input processing module 126 can extract input engineering values from the input data. The input data is then routed to an operating and monitoring module 128 that can be programmed according to one or more functions associated with the monitoring of the engine. Such functions, for example and not by limitation, can include looking at a rate of change of the data provided by a particular engine sensor. Another non-limiting function can include comparing the input data with a predetermined threshold to see whether the input data are below or above the predetermined threshold. Furthermore, the operating and monitoring module 128 can output, as a result of the its pre-programmed functions, calculated engineering values based on the input data.

The input engineering values from the input processing module 126 and the calculated engineering values from operating and monitoring module 128 are packaged together at an aggregating module 130 whose output is then fed to a fast-rate data buffer 134 and a slow rate data buffer 132. The respective rates of each of these buffers may be predetermined or they may be set or adjusted dynamically, based on threshold values set in the operating and monitoring module 128. The data buffers each outputs a stream to a smart monitoring processor 124 that performs one or more tasks that intelligently determine what goes on to a smart data stream 136 that is routed to the external storage 120 and/or to the internal storage 118.

Figure 2:
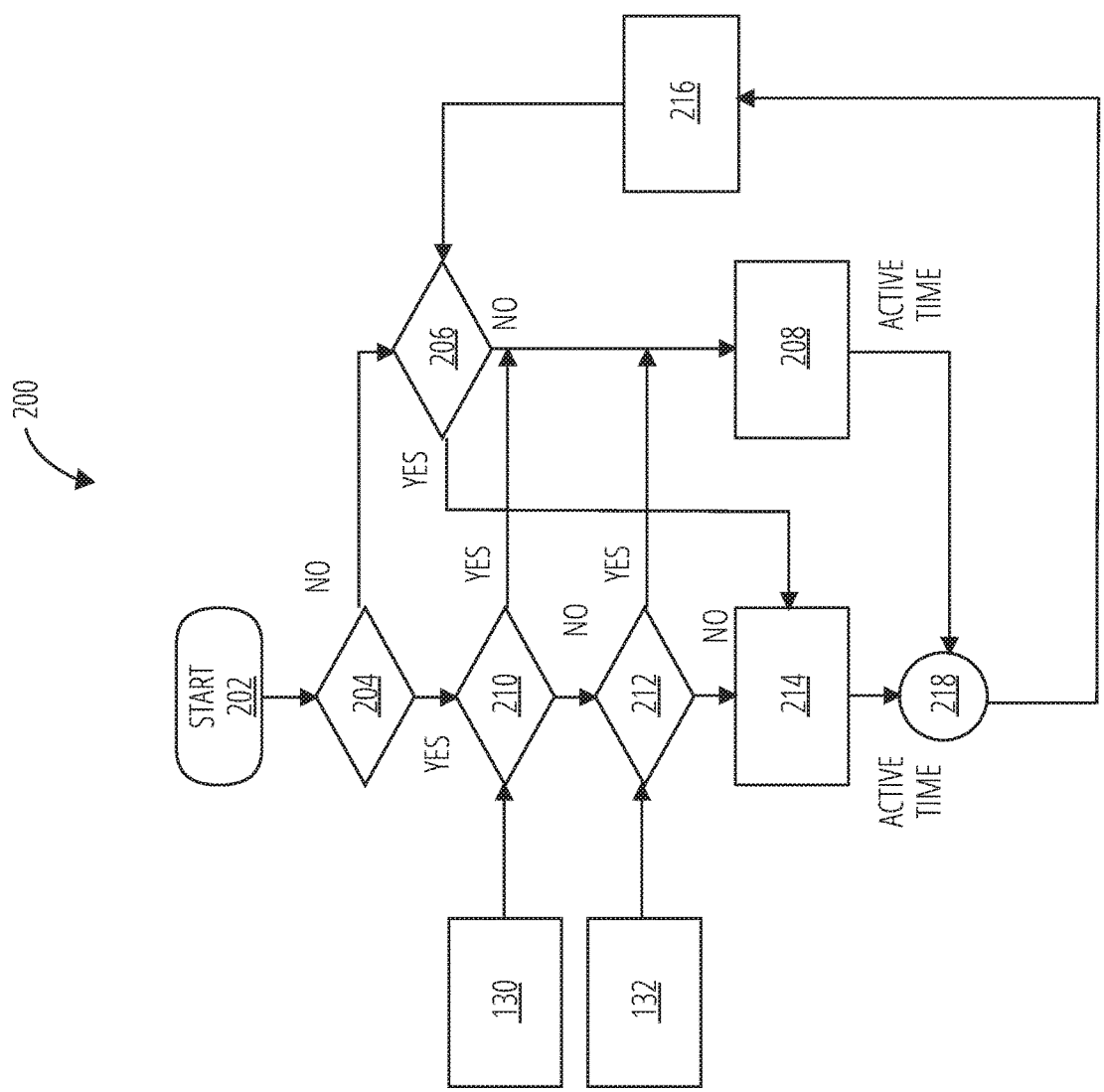
FIG. 2 illustrates a method in accordance with one embodiment.

FIG. 2 illustrates the smart monitoring processor 124 referred to in FIG. 1 according to one possible embodiment. The smart monitoring processor 124 is an application-specific processor that is configured to perform the smart monitoring functions described herein. In one possible embodiment, the smart monitoring processor 124 is configured to execute a set of instructions consistent with the method 200 shown in FIG. 2.

The method 200 begins at start block 202 upon receiving inputs from the slow rate data buffer 132 at decision block 204 and from the fast-rate data buffer 134 at decision block 212. The method 200 includes first checking whether an event (such as an abnormal reading in the measured data) is detected. When an event is detected (YES at decision block 204), the decision block 204 checks whether the data from the slow rate data buffer 132 includes a number of occurrences of the event that exceeds a predetermined maximum. In the event that the data from the slow rate data buffer 132 does not include the desired number of occurrences, the method 200 continues to the decision block 212 where the same check on the number of event is performed on the data from the fast-rate data buffer 134.

When the data from the fast-rate data buffer 134 does not include the desired number of occurrences (NO at the decision block 212), the method 200 includes performing a fast recording operation in addition to a lookback feature (block 214) that includes parsing the data buffer by a predetermined length to look in the buffer whether the event had occurred in the past. The method 200 then moves to a computational block (block 218) where a ratio of a moving average of a fast-to-slow recording ratio is computed, the slow recording data coming from a slow recording function of the method 200 (block 208). The moving average of the ratio is then used to adjust different trigger thresholds (block 216).

When the operation at the decision block 204 is NO, the method 200 moves to the decision block 206 where it is decided whether to trigger fast or slow recording (YES or NO at the decision block 206, respectively). Furthermore, when the number of occurrences exceeds the maximum number of occurrences, the method 200 moves from the decision block 210 (YES) and executes slow recording at the block 208. Similarly, when the number of occurrences exceeds the maximum number of occurrences, the method 200 moves from the decision block 212 (YES) and executes slow recording at the block 208. The method 200 dynamically and continually outputs a smart data stream at block 216.

Figure 3:
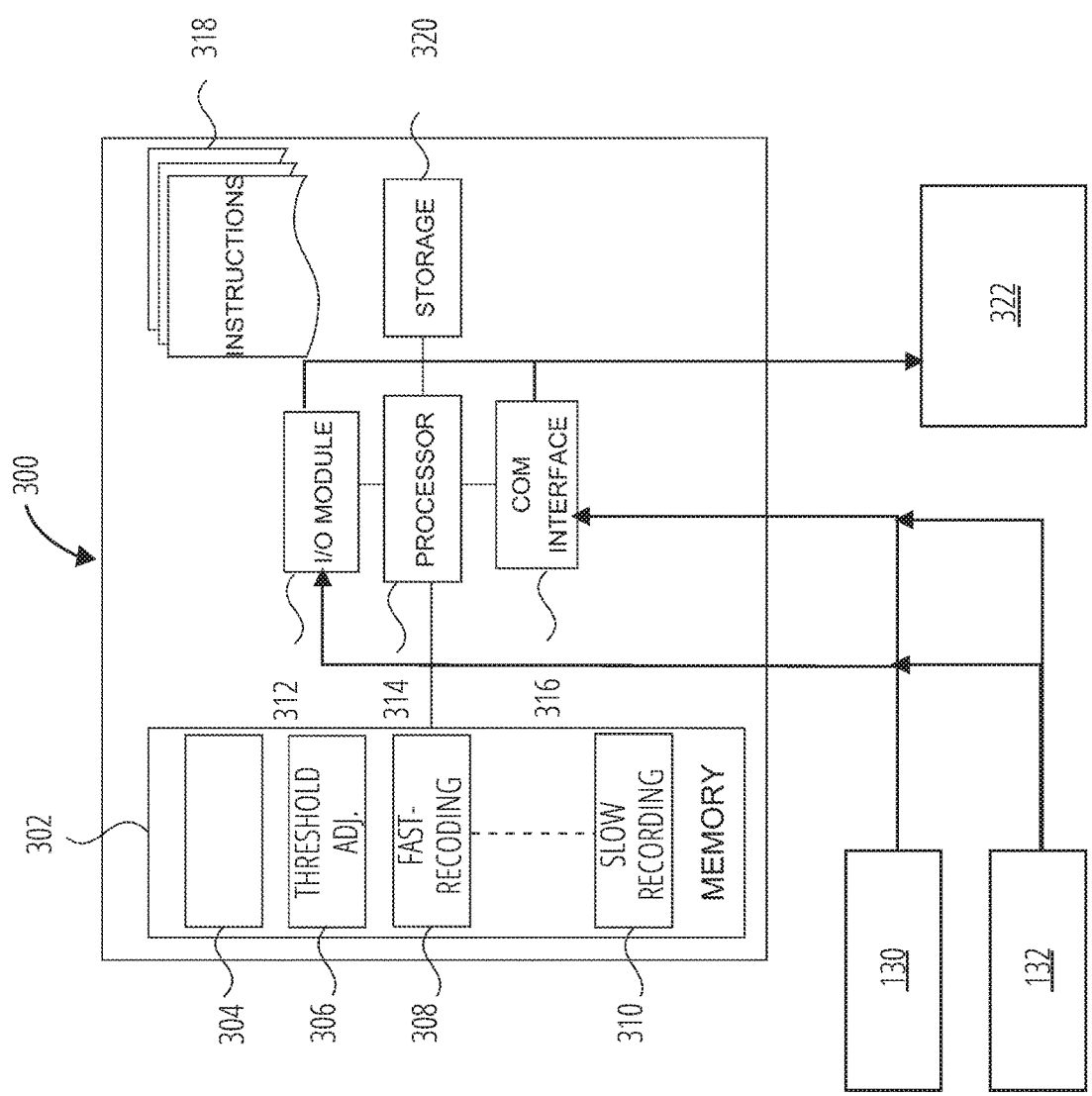
FIG. 3 illustrates a system in accordance with one embodiment.

FIG. 3 depicts a system 300 that includes an application-specific processor 314 configured to perform tasks specific to smart and continuous data recording from aircraft engines. The processor 314 has a specific structure imparted by instructions stored in a memory 302 and/or by instructions 318 that can be fetched by the processor 314 from a storage 320. The storage 320 may be co-located with the processor 314, or it may be located elsewhere and be communicatively coupled to the processor 314 via a communication interface 316, for example.

The system 300 can be a stand-alone programmable system, or it can be a programmable module located in a much larger system. For example, the system 300 can be part of an EMU. The processor 314 may include one or more hardware and/or software components configured to fetch, decode, execute, store, analyze, distribute, evaluate, and/or categorize information.

Furthermore, the processor 314 can include an input/output module (I/O module 312) that can be configured to ingest data pertaining to single assets or fleets of assets. The processor 314 may include one or more processing devices or cores (not shown). In some embodiments, the processor 314 may be a plurality of processors, each having either one or more cores. The processor 314 can be configured to execute instructions fetched from the memory 302, i.e. from one of memory block 304, memory block 306, memory block 308, and memory block 310.

Furthermore, without loss of generality, the storage 320 and/or the memory 302 may include a volatile or non-volatile, magnetic, semiconductor, tape, optical, removable, non-removable, read-only, random-access, or any type of non-transitory computer-readable computer medium. The storage 320 may be configured to log data processed, recorded, or collected during the operation of the processor 314. The data may be time-stamped, location-stamped, cataloged, indexed, or organized in a variety of ways consistent with data storage practice. The storage 320 and/or the memory 302 may include programs and/or other information that may be used by the processor 314 to perform tasks consistent with those described herein.

For example, the processor 314 may be configured by instructions from the memory block 306, the memory block 308, and the memory block 310, to perform operations threshold adjusting, fast recording, and slow recording, respectively. Upon receiving inputs from the slow rate data buffer 132 and the fast-rate data buffer 134, the processor 314 may execute the aforementioned instructions from memory blocks, 306, 308, and 310, and output a file containing a smart data stream 136 via the output 322.

Generally, the embodiments featured herein allow smart and continuous recording of engine operational data in an EMU. In such an application, there is a trade off the content with file size; i.e., more parameters, recorded at higher speeds, result in larger data files. Conversely, operators want minimal maintenance burden (for manual data retrieval) or minimal time/cost for wireless transmission at the gate or in flight. The embodiments herein help solve or mitigate these issues.

Those skilled in the relevant art(s) will appreciate that various adaptations and modifications of the embodiments described above can be configured without departing from the scope and spirit of the disclosure. Therefore, it is to be understood that, within the scope of the appended claims, the teachings featured herein may be practiced other than as specifically described herein.

What is claimed is:

1. A system for monitoring an engine, the system comprising:
   a processor;
   a memory including instructions that, when executed by the processor, cause the processor to perform operations including:
   receiving a first data set and a second data set, the first data set having been sampled at a first rate and the second data set having been sampled at a second rate, the first and second rates being different;
   determining based on a number of occurrences in either the first data set or the second set, whether an event that has occurred in the engine has occurred a predetermined number of times;
   in response to the number of occurrences exceeding the predetermined number of times, recording the first data set as an output; and
   in response to the number of occurrences not exceeding the predetermined number of times, recording the second data set as the output.

2. The system of claim 1, wherein the first rate is lower than the second rate.

3. The system of claim 1, wherein the first data set and the second data set are fetched from a slow-rate data buffer and a fast-rate data buffer, respectively.

4. The system of claim 1, wherein the output is a smart stream of data including sections having data having more than one sampling rate.

5. The system of claim 1, wherein the output is a file.

6. The system of claim 1, wherein the operations further include computing a ratio of fast-to-slow recording.

7. The system of claim 6, wherein the operations further include computing a moving average of the ratio.

8. The system of claim 7, wherein the operations further include adjusting an output file size according to the moving average of the ratio.

9. The system of claim 6, wherein the operations further include updating a threshold.

10. A system for monitoring an engine, the system comprising:
- a processor;
- a memory including instructions that, when executed by the processor, cause the processor to perform operations including:
- computing a ratio of a fast recording process time to a slow recording process time; and
- adjusting an output file size growth rate according the ratio.

11. The system of claim 10, wherein the output file size growth rate is decreased when the ratio is larger than a threshold.

12. The system of claim 10, wherein the output file size growth rate is increased when the ratio is lower than a threshold.

13. The system of claim 10, wherein the operations further include determining whether a parameter from an input data stream has exceeded a threshold.

14. The system of claim 13, wherein the operations further include executing one of the fast recording process and the slow recording process based on the parameter crossing the threshold.

15. The system of claim 10, further comprising adjusting a parameter threshold based on the ratio.

16. A method for monitoring an engine, the method comprising:
- receiving, by a system communicatively coupled to the engine, a first data set and a second data set, the first data set having been sampled at a first rate and the second data set having been sampled at a second rate, the first and second rates being different;
- determining, by the system, based on a number of occurrences in either the first data set or the second set, whether an event that has occurred in the engine has occurred a predetermined number of times;
- in response to the number of occurrences exceeding the predetermined number of times, recording, by the system, the first data set as an output; and
- in response to the number of occurrences not exceeding the predetermined number of times, recording, by the system, the second data set as the output.

17. The method of claim 16, wherein the first rate is lower than the second rate.

18. The method of claim 16, wherein the output is a smart stream of data including sections having data having more than one sampling rate.

19. The method of claim 16, wherein the output is a file.

20. The method of claim 16, wherein the operations further include computing a ratio of fast-to-slow recording.

* * * * *